US012676406B2

(12) United States Patent \
Baamonde Lorenzo et al.

(10) Patent No.: US 12,676,406 B2 \
(45) Date of Patent: Jul. 7, 2026

(54) RADOME ILLUMINATED GRILLE

(71) Applicant: RESRG AUTOMOTIVE LLC, Troy, MI (US)

(72) Inventors: Pablo Baamonde Lorenzo, Liria (ES); Sergio Piles Guillem, Liria (ES); Juan Monleon, Liria (ES); Robert W. Frayer, Huntington Woods, MI (US)

(73) Assignee: RESRG AUTOMOTIVE LLC, Troy, MI (US)

( * ) Notice: Subject to any disclaimer, the term of this patent is extended or adjusted under 35 U.S.C. 154(b) by 21 days.

(21) Appl. No.: 18/727,703

(22) PCT Filed: Jan. 12, 2023

(86) PCT No.: PCT/IB2023/050277 \
§ 371 (c)(1), \
(2) Date: Jul. 10, 2024

(87) PCT Pub. No.: WO2023/135540 \
PCT Pub. Date: Jul. 20, 2023

(65) Prior Publication Data \
US 2025/0226576 A1 Jul. 10, 2025

(30) Foreign Application Priority Data

Jan. 12, 2022 (ES) ................................... 202230018 \
Apr. 1, 2022 (ES) ................................... 202230301

(51) Int. Cl. \
*B32B 3/10* (2006.01) \
*B32B 27/08* (2006.01) \
(Continued)

(52) U.S. Cl. \
CPC ................. *H01Q 1/42* (2013.01); *B32B 3/10* (2013.01); *B32B 27/08* (2013.01); *B32B 27/365* (2013.01); \
(Continued)

(58) Field of Classification Search \
CPC .... B32B 3/10; B32B 3/18; B32B 3/22; H01Q 1/42; H01Q 1/421 \
See application file for complete search history.

(56) References Cited

U.S. PATENT DOCUMENTS

2011/0047784 A1 3/2011 Ohtake \
2017/0036594 A1 2/2017 Roberts \
(Continued)

FOREIGN PATENT DOCUMENTS

FR 3104834 A1 6/2021

OTHER PUBLICATIONS

International Preliminary Report on Patentability received for PCT Application No. PCT/IB2023/050277, mailed on Jul. 25, 2024, 14 pages.

(Continued)

*Primary Examiner* — Elizabeth E Mulvaney \
(74) *Attorney, Agent, or Firm* — Alston & Bird LLP

(57) ABSTRACT

Trim components, such as automotive radomes and automotive grille assemblies, and their methods of manufacture include a polycarbonate (PC) member defining a radar-transmissive radar zone and a multi-layer stack arranged on both a front or A-side of the PC member and a back or B-side of the PC member such that the PC member is therebetween, the multi-layer stack including a plurality of layers configured to provide protection of the front or A-side of the PC member, provide a visible decoration on the back or B-side of the PC member, provide a heater assembly configured to selectively heat the radar zone, and provide leveling in the radar zone. At least some of the plurality of layers, such as the PC member or a heating assembly layer, could be light diffusive.

20 Claims, 8 Drawing Sheets

(51) Int. Cl.

| | | |
|---|---|---|
| *B32B 27/36* | (2006.01) | |
| *B32B 27/40* | (2006.01) | |
| *B60R 13/04* | (2006.01) | |
| *G01S 7/02* | (2006.01) | |
| *G01S 13/931* | (2020.01) | |
| *H01Q 1/02* | (2006.01) | |
| *H01Q 1/42* | (2006.01) | |

(52) U.S. Cl.
CPC .............. *B32B 27/40* (2013.01); *B60R 13/04* (2013.01); *G01S 7/02* (2013.01); *G01S 13/931* (2013.01); *H01Q 1/02* (2013.01); *B32B 2307/41* (2013.01); *B32B 2307/584* (2013.01); *B32B 2451/00* (2013.01); *B32B 2605/00* (2013.01)

(56) References Cited

U.S. PATENT DOCUMENTS

| 2018/0090831 | A1 | 3/2018 | Frayer et al. | |
|---|---|---|---|---|
| 2018/0159207 | A1* | 6/2018 | Shurish | H01Q 1/421 |
| 2020/0335864 | A1 | 10/2020 | Shurish | |
| 2021/0376458 | A1* | 12/2021 | Holzleitner | B05D 7/04 |
| 2021/0384622 | A1 | 12/2021 | Caruso | |
| 2022/0065422 | A1* | 3/2022 | Caruso | F21S 43/239 |
| 2022/0328957 | A1* | 10/2022 | Mayer Pujadas | H01Q 1/3275 |
| 2024/0356206 | A1* | 10/2024 | Mayer Pujadas | H01Q 1/32 |

OTHER PUBLICATIONS

International Search Report and Written Opinion received for PCT Application No. PCT/IB2023/050277, mailed on Jun. 28, 2023, 20 pages.

\* cited by examiner

RADOME ILLUMINATED GRILLE

CROSS-REFERENCE TO RELATED APPLICATIONS

The present application claims priority to and the benefit of Spanish Patent Application Number P202230301, filed on Apr. 1, 2022, and Spanish Patent Application Number P202230018, filed on Jan. 12, 2022. The disclosures of both the above-identified applications are incorporated herein by reference in their entireties.

BACKGROUND

Related Field

The present application relates to a process for vehicle trim components and, more particularly, to a radome illuminated vehicle grille.

Related Art

Vehicle exteriors are continuously changing. Design trends, combined with electrification and autonomous driving, are fostering the integration of multiple type of sensors in decorative surfaces, which at the same time combine surface treatments with decorative and functional lighting. Front grilles and exterior panels are expected to combine these design trends and the relevant technologies in a seamless appearance while also enabling hidden functions and assuring desired performance in required environmental conditions. Thus, while conventional vehicle trim components and their methods of manufacture do work for their intended purpose, there exists an opportunity for improvement in the relevant art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one aspect of the present disclosure, a trim component is presented. In one exemplary implementation, the trim component comprises a polycarbonate (PC) member defining a radar-transmissive radar zone and a multi-layer stack arranged on both a front or A-side of the PC member and a back or B-side of the PC member such that the PC member is therebetween, the multi-layer stack comprising a plurality of layers configured to provide protection of the front or A-side of the PC member, provide a visible decoration on the back or B-side of the PC member, provide a heater assembly configured to selectively heat the radar zone, and provide leveling in the radar zone.

In some implementations, the multi-layer stack comprises a multi-layer opaque decorative film layer disposed on the back or B-side of the PC member and comprising a heater assembly layer and a leveling material layer in the radar zone, and a polyurethane reactive (PUR) lamination layer disposed on a front or A-side of the PC member. In other implementations, the multi-layer stack comprises a front protective layer disposed on the front or A-side of the PC member, a pad print decorative layer disposed on the back or B-side of the PC member, a physical vapor deposition (PVD) decorative layer disposed on the back or B-side of the PC member, and a leveling material layer applied to the back or B-side of the PC member in the radar zone and the heater assembly layer integrated therein. In yet other implementations, the multi-layer stack comprises a front protective layer disposed on the front or A-side of the PC member, a laser ablated paint decorative layer disposed on a back or B-side of the PC member, a physical vapor deposition (PVD) decorative layer disposed on the back or B-side of the PC member, and a leveling material layer applied to the back or B-side of the PC member in the radar zone and the heater assembly layer integrated therein.

In some implementations, at least one of the plurality of layers of the multi-layer stack is light diffusive. In some implementations, the heating assembly layer is light diffusive. In some implementations, the PC member is formed of a light diffusive grade of PC such that it is light diffusive. In some implementations, the plurality of layers of the multi-layer stack further comprises a light diffusive film or finish layer applied to at least one of the front or A-side and the back or B-side of the PC member. In some implementations, the trim component is an automotive radome. In some implementations, the trim component is an automotive grille assembly. According to another aspect of the present disclosure, a method of forming the trim component is presented. In some implementations, the PC member is formed by injection molding. In some implementations, the injection molding is a multi-shot injection molding process. In some implementations, the method further comprises physical vapor deposition (PVD). In some implementations, the method further comprises film deposition.

According to another aspect of the present disclosure, a radome illuminated grille is presented. In one exemplary implementation, the radome illuminated grille comprises a polycarbonate (PC) grille member defining a radar-transmissive radar zone, a multi-layer opaque decorative film layer disposed on a back or B-side of the PC grille member and comprising a heater assembly configured to selectively heat the radar zone and a leveling material in the radar zone, and a polyurethane reactive (PUR) lamination layer disposed on a front or A-side of the PC grille member. According to another aspect of the present disclosure, a method of manufacturing the radome illuminated grille is presented. In one exemplary implementation, the method comprises forming/obtaining a decorative film and inserting the decorative film into a tool/mold, forming a polycarbonate (PC) grille member via a first shot/mold step, the PC grille member defining a radar-transmissive radar zone, applying a leveling material on a back or B-side of the PC grille member in the radar zone via a second shot/mold step, the leveling including a multi-layer opaque decorative film including a heater assembly configured to selectively heat the radar zone, applying a polyurethane reactive (PUR) lamination layer on a front or A-side of the PC grille member, and assembling/removing a final part from the tool/mold to obtain the radome illuminated grille.

According to another aspect of the present disclosure, a radome illuminated grille is presented. In one exemplary implementation, the radome illuminated grille comprises a polycarbonate (PC) grille member defining a radar-transmissive radar zone, a front protective layer disposed on a front or A-side of the PC grille member, a pad print decorative layer disposed on a back or B-side of the PC grille member, a physical vapor deposition (PVD) decorative layer disposed on the back or B-side of the PC grille member, a leveling material applied to the back or B-side of the PC grille member in the radar zone, and a heater assembly integrated therein and configured to selectively heat the radar zone. According to another aspect of the present disclosure, a method of manufacturing the radome illuminated grille is presented. In one exemplary implementation, the method comprises molding a polycarbonate (PC) grille member defining a radar-transmissive radar zone, applying a front protective layer on a front or A-side of the PC grille member, applying a pad print decorative layer on a back or B-side of the PC grille member, applying a physical vapor deposition (PVD) decorative layer on the back or B-side of the PC grille member, applying a leveling material in the radar zone, and assembling/integrating a heater assembly configured to selectively heat the radar zone and form the radome illuminated grille.

According to yet another aspect of the present disclosure, a radome illuminated grille is presented. In one exemplary implementation, the radome illuminated grille comprises a polycarbonate (PC) grille member defining a radar-transmissive radar zone, a front protective layer disposed on a front or A-side of the PC grille member, a laser ablated paint decorative layer disposed on a back or B-side of the PC grille member, a physical vapor deposition (PVD) decorative layer disposed on the back or B-side of the PC grille member, a leveling material applied to the back or B-side of the PC grille assembly in the radar zone, and a heater assembly integrated therein and configured to selectively heat the radar zone. According to another aspect of the present disclosure, a method of manufacturing the radome illuminated grille is presented. In one exemplary implementation, the method comprises molding a polycarbonate (PC) grille member defining a radar-transmissive radar zone, applying a front protective layer on a front or A-side of the PC grille member, applying a paint layer disposed on a back or B-side of the PC grille member, laser ablating the paint layer to form a decorative paint layer, applying a physical vapor deposition (PVD) decorative layer on the back or B-side of the PC grille member, applying a leveling material to the back or B-side of the PC grille member in the radar zone, and assembling/integrating a heater assembly configured to selectively heat the radar zone and form the radome illuminated grille.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the examples of the present disclosure are intended to be within the scope of the present disclosure.

DETAILED DESCRIPTION OF VARIOUS EMBODIMENTS

Figure 1A:
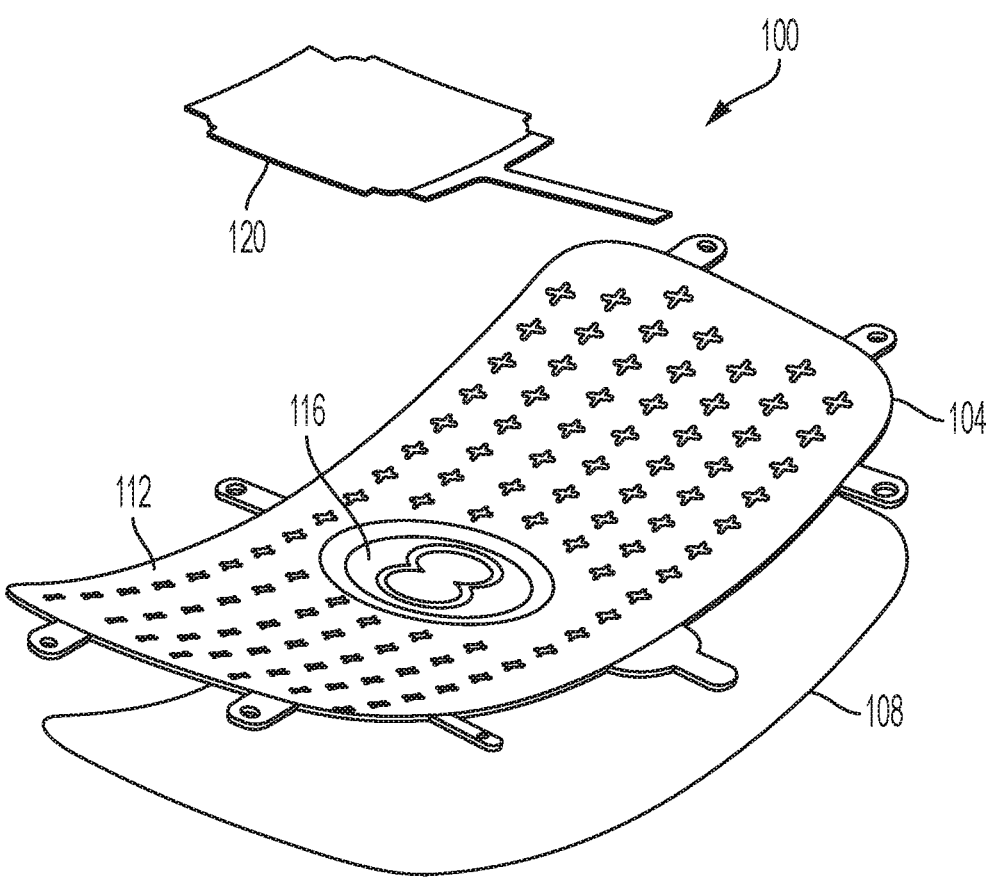
FIGS. 1A-1D illustrate exploded views and a cross-sectional view of a first example radome illuminated grille configuration and a flow diagram of an example method of its manufacture according to some embodiments of the present disclosure.

As previously discussed, there exists an opportunity for improvement in the art of vehicle exterior panels (e.g., front grilles) that combine design trends and relevant technologies in a seamless appearance while also enabling hidden functions and assuring desired performance in required environmental conditions. The disclosed systems and methods provide a variety of solutions for solving the way exterior panels are manufactured to allow the integration of lighting and sensing technologies seamlessly under the same cover. These improved systems and methods also provide a way to level the surface in front of a radar wave to minimize wave distortion. Further, these systems and methods also provide a way to integrate a heating element while minimizing radar wave distortion allowing de-icing of the A-surface. These should be understood as non-limiting advantages and improvements achieved via these systems and methods.

The plurality of different potential solutions to the above-described problems including systems (radomes, automotive grille assemblies, etc.), methods of manufacture (multi-shot injection molding, film/PVD deposition, etc.), and possible combinations thereof. One solution uses a resin deposition process to level the back surface (applying resin only or using the resin to adhere a second part). Alternatively, a multi-shot (e.g., two-shot, or 2K) injection molding process could be used. This solution also uses a heating film adhered to/included in the stack-up and allows for the inclusion of a diffusing function and remove any additional diffusing element. The diffusive layer, for example, could be part of decoration film.

While the term "radome" and "radome illuminated grille" are used herein, it will be appreciated that the automotive part for the systems/methods of the present disclosure could be a separate radome device of an automotive grille assembly or the automotive grille assembly itself (e.g., whereas the automotive grille assembly functions as a radome).

Referring now to FIGS. 1A-1D, exploded views and a cross-sectional view of a first exemplary radome illuminated grille configuration 100 and a flow diagram of an exemplary method 150 of its manufacture according to some embodiments of the present disclosure are illustrated. This radome illuminated grille configuration 100 is formed via a multi-shot (e.g., 2K) film process. This configuration 100 generally comprises a grille member 104 (e.g., clear polycarbonate, or PC panel) and a front protective coating 108. On a back or B-side of the grille member 104 is an opaque decorative layer in the form of an insert molded film 112 including a heating assembly (see below). In this configuration, a desirable option could be a three-shot (3K) process with a polyurethane reactive (PUR) layer 108 on the front or A-side and a PC layer on the back or B-side for leveling. The primary, although non-exclusive, improvement here is a film providing decoration and heating and a multi-shot process including PUR. The final part provides for the require leveling on the B-side for optimal radar performance, all in a single process.

A radar zone 116 may also be present behind a center emblem, but it will be appreciated that the radar zone 116 could be positioned in other suitable locations (e.g., offset from center). Lastly, a heating assembly stack 120 may be provided to selectively heat the radar zone to prevent accumulation (e.g., snow or ice) that would negatively affect radar transmission. As shown, there are a variety of leveling options for this configuration 100. For example, in one embodiment, leveling can be achieved via the heating assembly stack 120 (e.g., a heated film 125, an optically clear adhesive (OCA) lamination 126 (optional depending on design/configuration), a leveling material 127 such as curable adhesive such as methacrylate ester or a resin (e.g., an epoxy resin), or a thermoplastic or PUR, with the leveling material being applied in the radar zone and intended to achieve a uniform thickness for radar transmission perfor- mance, a frame 128, and an adhesive 129). In another embodiment, leveling can be achieved via PC 130 over-molding. In another embodiment, leveling can be achieved via the heating assembly stack 120 having a PC layer 132 with an over-molded heated film layer 133 (to form 134) and the resin 135 (e.g., an epoxy resin).

Figure 1B:
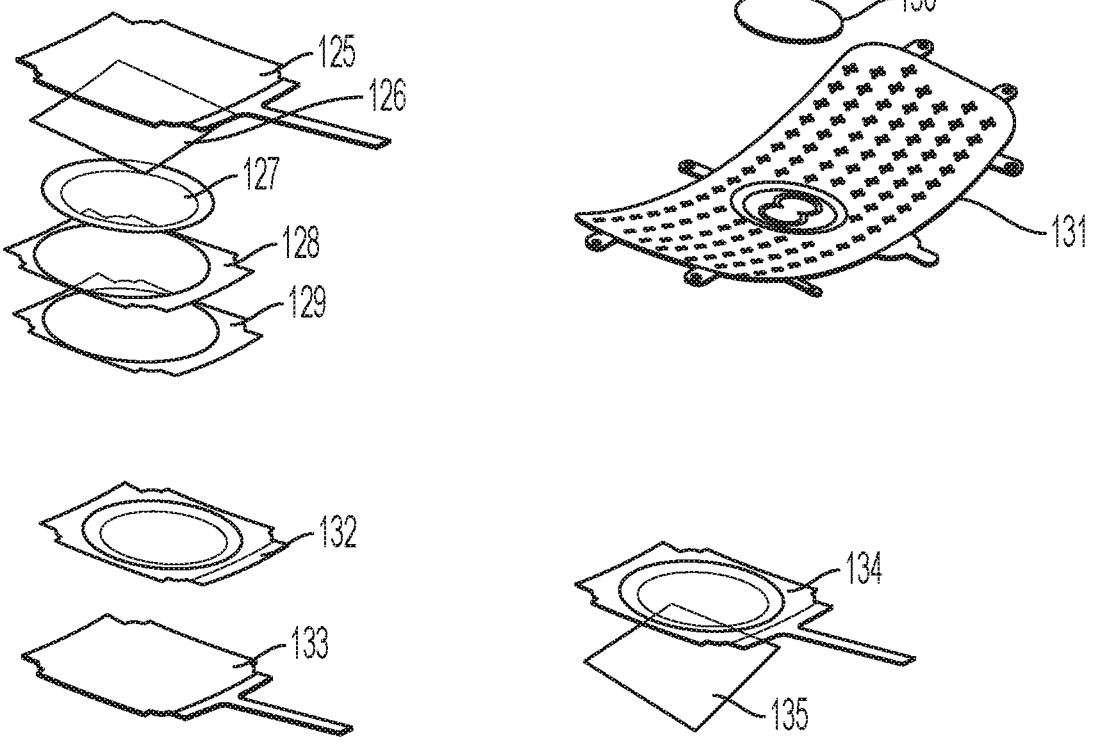
Figure 1C:
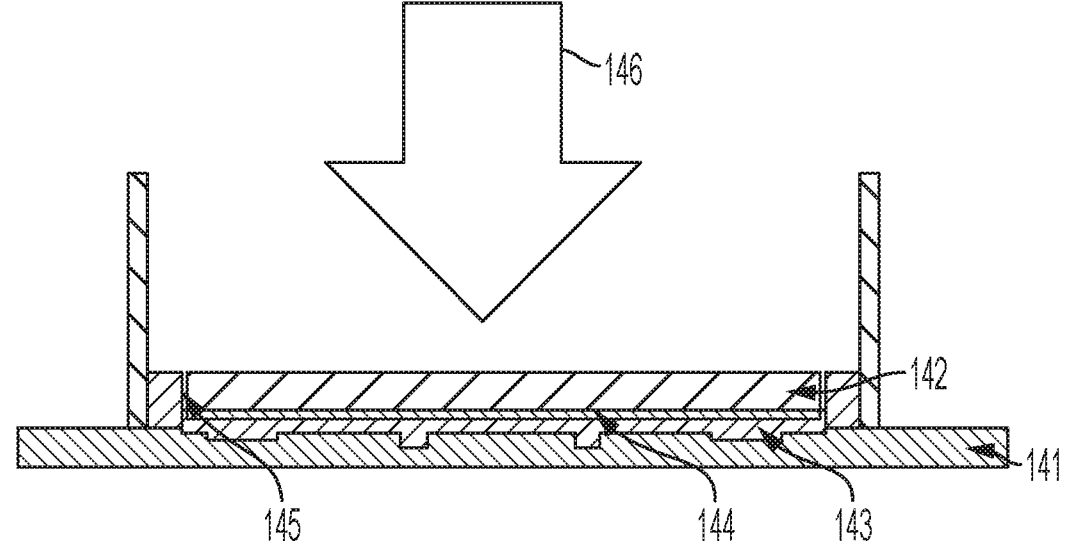

FIG. 1C illustrates a specific cross-sectional view of the configuration and the leveling. As shown in this example, the grille member 141, which could be formed of PC and have a thickness of approximately 4 mm, has a lens 142, which could be formed of PC, on its back or B-side. The grille member 141 also has a resin joining cover 143 on its back or B-side, with a film layer 144 (e.g., over-molded on a PC disk) disposed therebetween. There may also be a resin overflow channel 145 (optional depending on design/con- figuration) surrounding the lens 142, the resin joining cover 143, and the film layer 144. Ultraviolet light 146 may, in certain embodiments, be emitted towards the back or B-side for curing. In these and other embodiments, the lens 142 may be further configured as a lightguide to provide or emit light through the radar zone. The primary, although exem- plary, improvement is thus the filling any air gaps between respective layers/components and providing a uniform thickness to maximize radar performance. While PC is generally described herein due to its impact performance required in front automotive applications (e.g., as for front grille assemblies), it will be appreciated that some compo- nents (e.g., the lens 142) or all the components could be made of other suitable transparent materials, such as PMMA or the like (e.g., as for a rear vehicle application).

According to various embodiments, the heating film 144 may be applied on one or multiple surfaces of the assembly including the back surface of the grille member 141, the front surface of the lens 142, and/or the back surface of the lens 142. The heating film 144 may be formed to match the surface profile and may be applied with an in-mold film process or applied during assembly with an adhesive. The lens 142 could integrate the heating functionality, and the heating film 144 could have the added functionality of being light diffusive. In other embodiments, the heater may be applied on the back side of the decorative film as a separate part. Light diffusion could additionally or alternatively be achieved in a variety of different ways. For example, light diffusion can also be provided by the back lens by using a diffusive grade of PC or applying a diffusive film or finish on either side of the lens. The final part provides for the desired uniform thickness in the radar zone after assembly (e.g., the grille member+the leveling resin+the heating film+ the PC lens) for optimal radar performance.

Figure 1D:
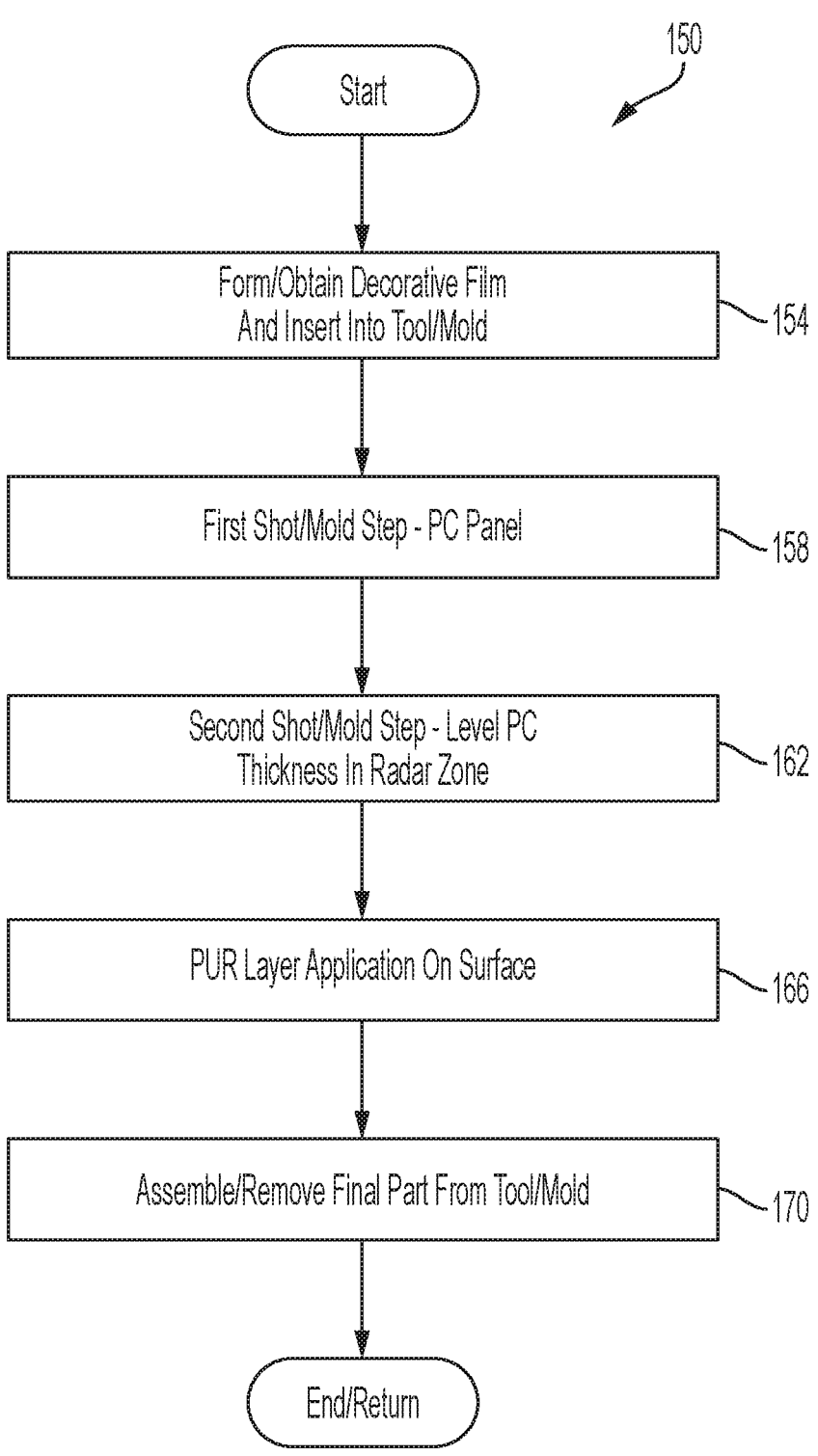

Referring now to FIG. 1D and with continued reference to FIGS. 1A-1C, a flow diagram of an exemplary method 150 of manufacturing the above-described configuration 100 according to some implementations of the present disclosure is illustrated. At 154, the decorative film is formed/obtained (with the integrated heater assembly) and inserted into the tool/mold. At 158, a first shot or molding step is performed to form the PC panel. At 162, a second shot or molding step is performed to level the PC thickness in the radar zone. At 166, the PUR layer 108 is formed on a surface. Lastly, at 170, the final part (a radome illuminated grille with heating functionality) is removed from the tool/mold. The method 150 then ends or returns to 154 for another manufacturing cycle. It should be understood that one or more steps of the method may be adjusted, reordered, and/or skipped, if desirable; additional steps may also be included, as neces- sary, for example when adhesive is involved.

Figure 2A:
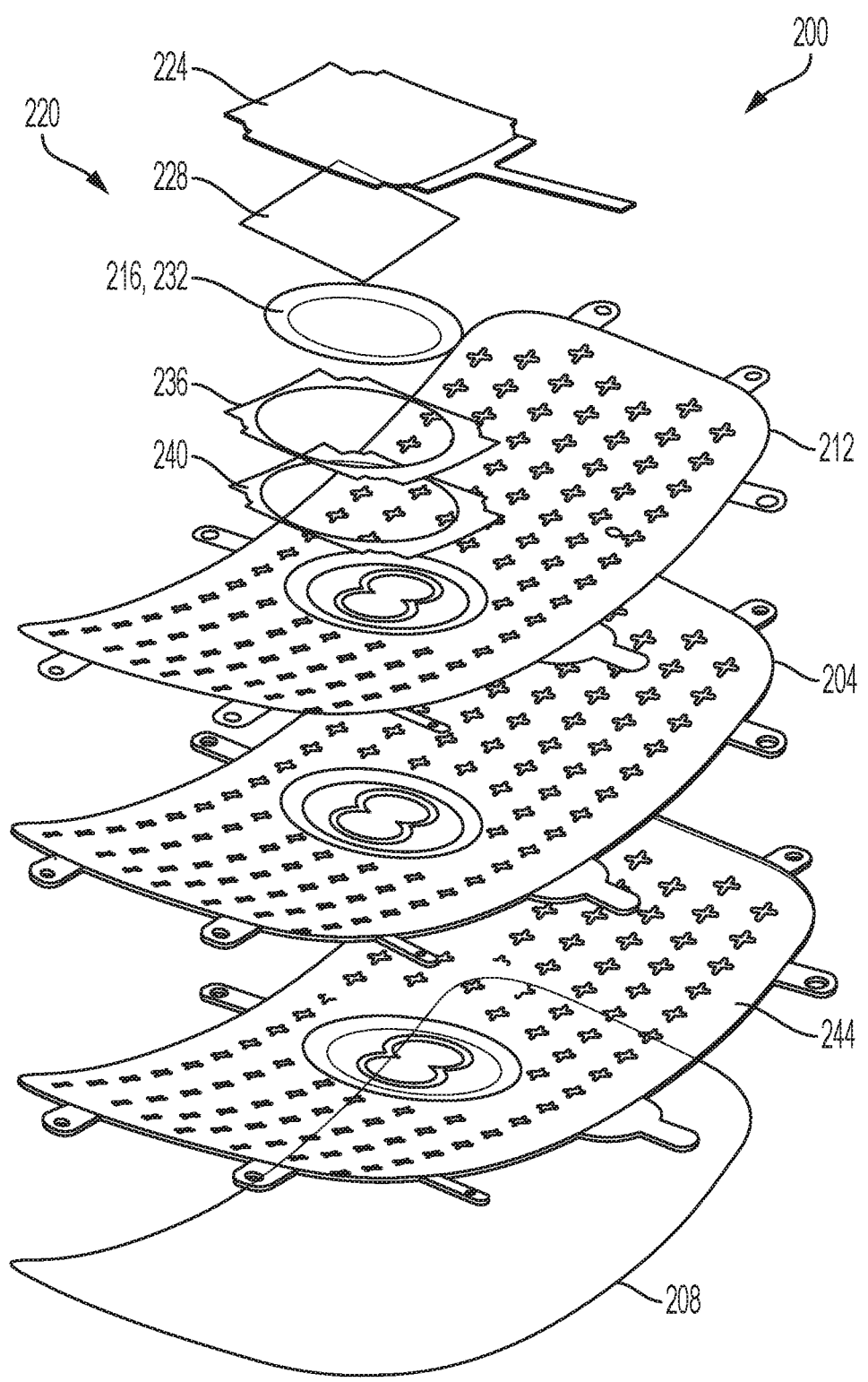
FIGS. 2A-2B illustrate an exploded view of a second example radome illuminated grille configuration and a flow diagram of an example method of its manufacture according to some embodiments of the present disclosure.
Figure 2B:
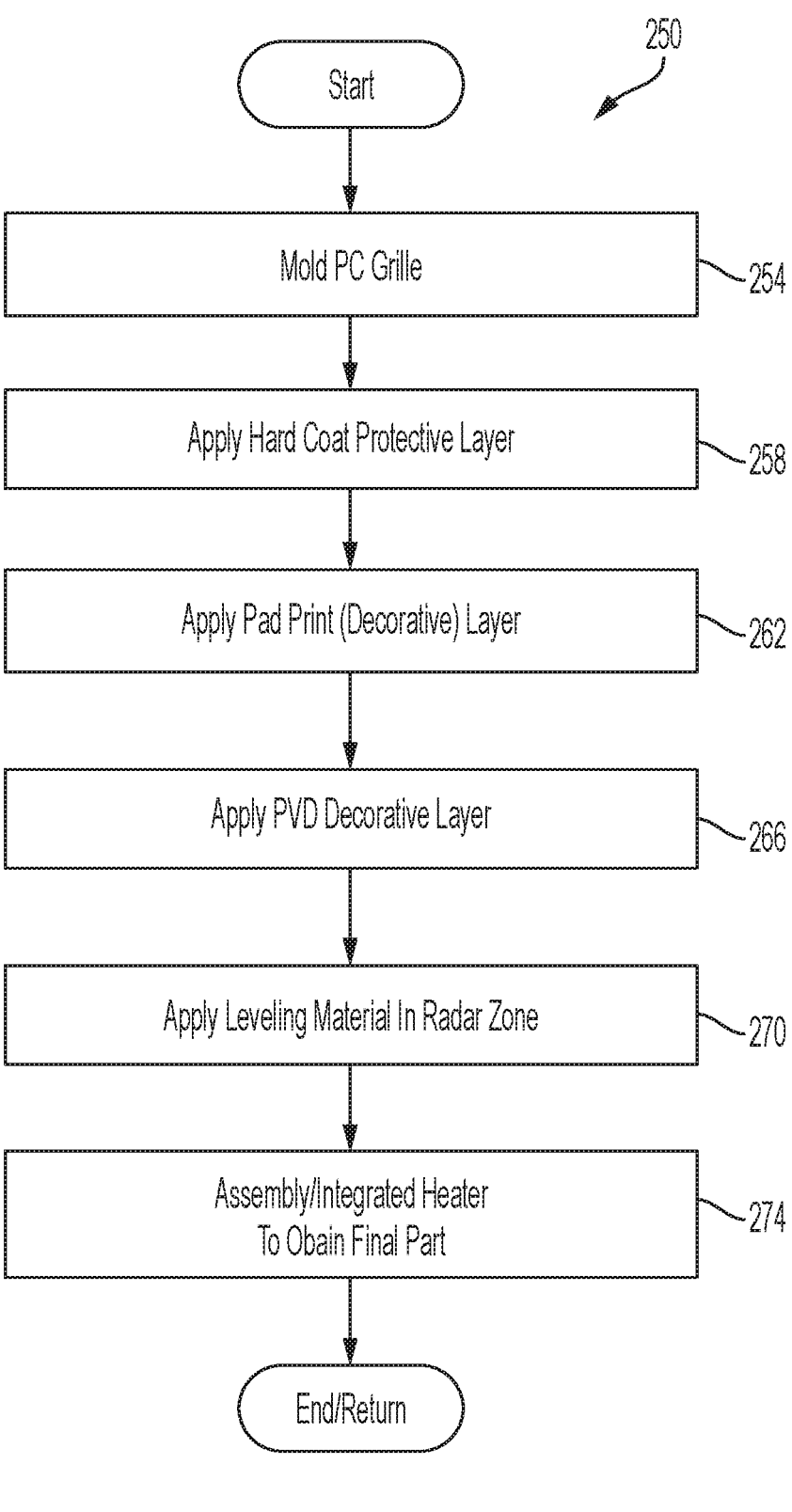

Referring now to FIGS. 2A-2B, an exploded view of a second example radome illuminated grille configuration 200 and a flow diagram of an example method 250 of its manufacture according to some embodiments of the present disclosure are illustrated. This radome illuminated grille configuration 200 is a combination of pad printing and physical vapor deposition (PVD). This configuration 200 generally comprises a grille member 244 (e.g., a clear polycarbonate, or PC panel) with a pad print layer 204 and a front protective coating 208. On a back or B-side of the grille member 244 is an opaque decorative film layer 212 (e.g., applied via PVD). A leveling material 216 may also present in a center of the grille member 204 or in another suitable area as previously discussed. Lastly, a heating assembly 224 may be provided to selectively heat the radar zone to prevent accumulation (e.g., snow or ice) that would negatively affect radar transmission. In one embodiment, this stack 220 includes the heated film 224, an OCA lami- nation 228, and the leveling material 216 (e.g., a curable adhesive, such as methacrylate ester, an epoxy resin, or a thermoplastic or PUR 232, a frame 236, and an adhesive 240).

Referring now to FIG. 2B and with continued reference to FIG. 2A, a flow diagram of an exemplary method 250 of manufacturing the above-described configuration 200 according to some implementations of the present disclosure is illustrated. At 254, the PC grille 244 is molded. At 258, a hard coat 208 is applied on a surface. At 262, a pad print (decorative) layer 204 is applied to a B-side. At 266, a PVD decorative layer 212 is applied to the B-side. At 270, the leveling material 216 is applied in the radar zone. Lastly, at 274, the heater assembly is formed and integrated therein to form the final part-a radome illuminated grille with heating functionality. The method 250 then ends or returns to 254 for another manufacturing cycle. Variations of the steps of method 250 are also envisioned, as with the method previ- ously described herein.

Figure 3A:
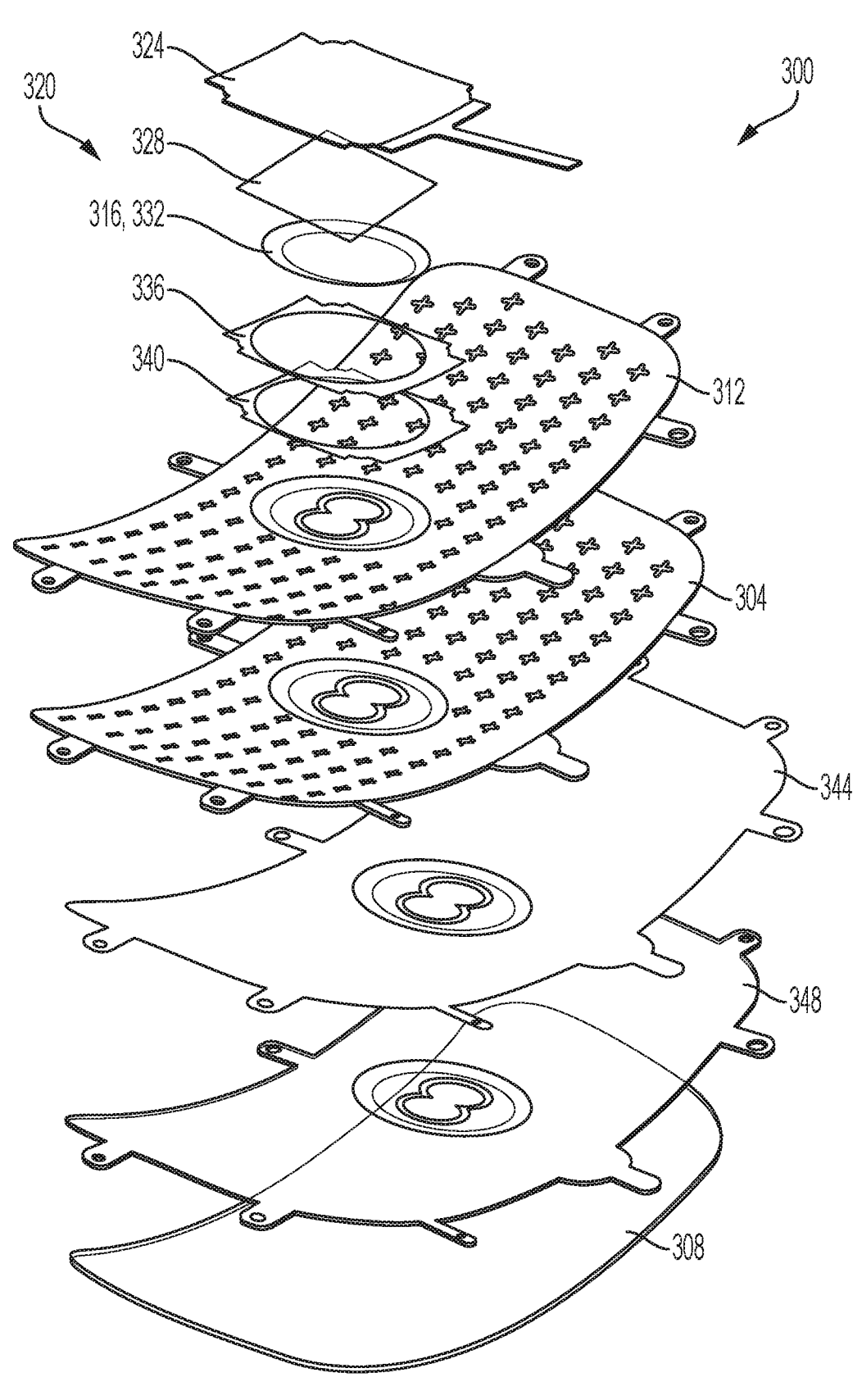
FIGS. 3A-3B illustrate an exploded view of a third example radome illuminate grille configuration and a flow diagram of an example method of its manufacture according to some embodiments of the present disclosure.
Figure 3B:
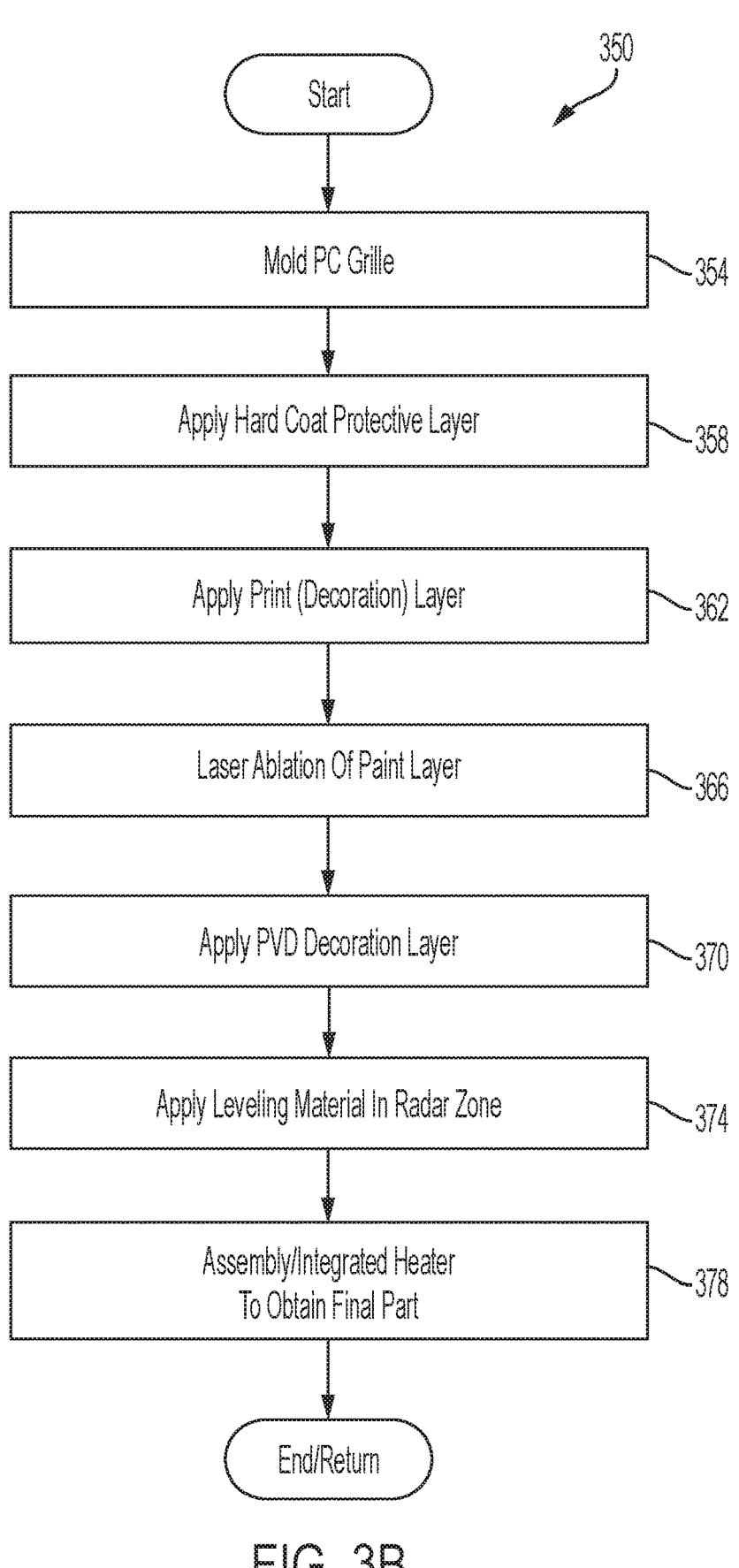

Referring now to FIGS. 3A-3B, an exploded view of a third example radome illuminated grille configuration 300 and a flow diagram of an example method 350 of its manufacture according to some embodiments of the present disclosure are illustrated. This radome illuminated grille configuration 300 is a combination of painting, laser etching, and PVD. At least this exemplary configuration 300 gener- ally comprises a grille member 348 (e.g., clear polycarbon- ate, or PC panel) with a thermal cure paint 344 and a front protective coating 308. Reference 304 indicates a laser ablation (subtractive process) applied to the thermal cure paint 344. On a back or B-side of the grille member 304 is an opaque decorative film layer 312 (e.g., via PVD). A radar zone 316 may also be present in a center of the grille member 304 or in another suitable location as previously discussed. Lastly, a stack 320 may be provided to selectively heat the radar zone 316 to prevent accumulation (e.g., snow or ice) that would negatively affect radar transmission. In one embodiment, this stack 320 includes a heated film 324, an adhesive 328, and the leveling material 320, also such as the configurations previously discussed herein.

Referring now to FIG. 3B and with continued reference to FIG. 3A, a flow diagram of an exemplary method 350 of manufacturing the above-described configuration 300 according to some implementations of the present disclosure is illustrated. At 354, the PC grille 348 is molded. At 358, the hard coat protective layer 308 is applied. At 362, the paint decoration layer 344 is applied to the B-side. At 366, laser ablation 304 of the paint layer 344 may be optionally applied. At 370, the PVD decoration layer 312 is applied to the B-side. At 374, the leveling material 320 is applied in the radar zone 316. Lastly, at 378, the heater assembly 324 may be assembled/integrated therein to form the final part-a radome illuminated grille with heating functionality. The method 350 then ends or returns to 354 for another manufacturing cycle. Variations of the steps of method 350 are also envisioned, as with the methods previously described herein.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a required sequence or order unless clearly indicated by the context. Thus, a first element, component, region, layer or section discussed below could be termed a second element, component, region, layer or section without departing from the teachings of the exemplary system and/or method embodiments described herein.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

The invention claimed is:

1. A trim component, comprising:
a polycarbonate (PC) member defining a radar-transmissive radar zone; and
a multi-layer stack comprising a plurality of layers, at least one of the plurality of layers being arranged on both a front or A-side of the PC member and a back or B-side of the PC member such that the PC member is therebetween, one or more of the plurality of layers being configured to:
(a) provide protection of the front or A-side of the PC member;
(b) provide a visible decoration on the back or B-side of the PC member; and
(c) provide leveling in the radar zone, wherein the leveling comprises a leveling material filling air gaps between the lens member and the PC member to provide a uniform thickness for optimal radar transmission performance.

2. The trim component of claim 1, wherein the plurality of layers further provide a heater assembly configured to selectively heat the radar zone.

3. The trim component of claim 1, wherein at least one of the plurality of layers of the multi-layer stack is light diffusive.

4. The trim component of claim 3, wherein at least one of the plurality of layers of the multi-layer stack is a lens member arranged on the back or B-side of the PC member.

5. The trim component of claim 4, wherein the lens member is further configured as a lightguide to direct and emit light within the radar zone and through a remainder of the multi-layer stack.

6. The trim component of claim 1, wherein the multi-layer stack comprises a multi-layer opaque decorative film layer disposed on the back or B-side of the PC member and comprising a heater assembly layer and a leveling material layer in the radar zone.

7. The trim component of claim 6, wherein the multi-layer stack further comprises a polyurethane reactive (PUR) lamination layer disposed on a front or A-side of the PC member.

8. The trim component of claim 1, wherein the multi-layer stack comprises:
a front protective layer disposed on the front or A-side of the PC member;
a pad print decorative layer disposed on the back or B-side of the PC member;
a physical vapor deposition (PVD) decorative layer disposed on the back or B-side of the PC member; and
a heater assembly integrated with the leveling material layer applied to the back or B-side of the PC member in the radar zone.

9. The trim component of claim 1, wherein the multi-layer stack comprises:
a front protective layer disposed on the front or A-side of the PC member;
a laser ablated paint decorative layer disposed on a back or B-side of the PC member;
a physical vapor deposition (PVD) decorative layer disposed on the back or B-side of the PC member; and
a heater assembly integrated with the leveling material layer applied to the back or B-side of the PC member in the radar zone.

10. The trim component of claim 1, wherein the heating assembly layer is light diffusive.

11. The trim component of claim 1, wherein the PC member is formed of a light diffusive grade of PC such that it is light diffusive.

12. The trim component of claim 1, wherein the plurality of layers of the multi-layer stack further comprises a light diffusive film or finish layer applied to at least one of the front or A-side and the back or B-side of the PC member.

13. The trim component of claim 1, wherein the trim component is an automotive radome.

14. The trim component of claim 1, wherein the trim component is an automotive grille assembly.

15. A method of forming the trim component of claim 1, the method comprising the step of positioning the multi-layer stack adjacent the polycarbonate (PC) member defining the radar-transmissive radar zone.

16. The method of claim 15, wherein the PC member is formed by injection molding.

17. The method of claim 16, wherein the injection molding is a multi-shot injection molding process.

18. The method of claim 15, wherein the method further comprises physical vapor deposition (PVD).

19. The method of claim 15, wherein the method further comprises film deposition.

20. The method of claim 15, wherein the process is iterative.

* * * * *